(12) United States Patent
Knowles

(10) Patent No.: US 10,690,520 B2
(45) Date of Patent: Jun. 23, 2020

(54) APPARATUS, SYSTEM, AND METHOD FOR DETERMINING A POSITION OF A PART

(71) Applicant: The Boeing Company, Chicago, IL (US)

(72) Inventor: Devin E. Knowles, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/443,928

(22) Filed: Feb. 27, 2017

(65) Prior Publication Data

US 2018/0245951 A1    Aug. 30, 2018

(51) Int. Cl.
| | |
|---|---|
| *G01D 5/14* | (2006.01) |
| *G01D 5/24* | (2006.01) |
| *G01B 7/14* | (2006.01) |
| *G01B 7/30* | (2006.01) |
| *G01R 33/06* | (2006.01) |
| *G01D 5/245* | (2006.01) |

(Continued)

(52) U.S. Cl.
CPC ............ *G01D 5/2451* (2013.01); *B64C 9/14* (2013.01); *B64C 13/24* (2013.01); *B64D 45/0005* (2013.01); *G01D 5/2497* (2013.01); *B64C 13/28* (2013.01); *B64C 13/36* (2013.01); *B64C 2009/005* (2013.01)

(58) Field of Classification Search
CPC ............ G01D 5/14; G01D 5/145; G01D 5/24; G01D 5/2451; G01B 7/14; G01B 7/30; G01R 33/06
See application file for complete search history.

(56) References Cited

U.S. PATENT DOCUMENTS 5,680,124 A * 10/1997 Bedell ................ B64D 45/0005
340/945
5,686,907 A   11/1997 Bedell et al.
(Continued)

FOREIGN PATENT DOCUMENTS

DE        19910636      9/2000
DE      102014220783    4/2016
(Continued)

OTHER PUBLICATIONS

European Search Report for EP Patent Application No. 17204353 dated May 9, 2018.
(Continued)

*Primary Examiner* — Neel D Shah
(74) *Attorney, Agent, or Firm* — Kunzler Bean & Adamson

(57) ABSTRACT

Disclosed herein is an apparatus for determining a position of a first part relative to a second part. The first part is movable relative to the second part. The apparatus comprises a magnetic position indicator and a magnetic field sensor. The magnetic position indicator is non-movably fixed to the first part and comprises a plurality of magnetic field sources positioned along a length of the magnetic position indicator. Each magnetic field source of the plurality of magnetic field sources generates a magnetic field having a unique magnetic signature. The magnetic field sensor is non-movably fixed to the second part and configured to detect the unique magnetic signatures of the magnetic fields generated by the plurality of magnetic field sources of the magnetic position indicator.

20 Claims, 8 Drawing Sheets

(51) Int. Cl.
*B64D 45/00* (2006.01)
*G01D 5/249* (2006.01)
*B64C 9/14* (2006.01)
*B64C 13/24* (2006.01)
*B64C 13/28* (2006.01)
*B64C 13/36* (2006.01)
*B64C 9/00* (2006.01)

(56) References Cited

U.S. PATENT DOCUMENTS

| | | | |
|---|---|---|---|
| 6,299,108 B1 | 10/2001 | Lindstrom et al. | |
| 6,545,463 B1 | 4/2003 | Dettmann et al. | |
| 8,115,649 B2 | 2/2012 | Moy et al. | |
| 8,864,083 B1 | 10/2014 | Shmilovich et al. | |
| 2004/0217758 A1* | 11/2004 | Leonard | G01D 5/145 324/207.2 |
| 2013/0179117 A1 | 7/2013 | Delbaere et al. | |
| 2013/0200884 A1* | 8/2013 | Manabe | G01B 7/14 324/207.16 |
| 2014/0292314 A1* | 10/2014 | Tokida | G01B 7/14 324/207.21 |
| 2016/0265941 A1* | 9/2016 | Mattheis | G01D 5/145 |
| 2016/0282142 A1 | 9/2016 | Becker et al. | |
| 2016/0297541 A1 | 10/2016 | Anderson | |
| 2017/0073082 A1 | 3/2017 | Ungar et al. | |
| 2017/0219380 A1 | 8/2017 | Schaefer | |
| 2018/0111697 A1 | 4/2018 | Jones | |

FOREIGN PATENT DOCUMENTS

| | | |
|---|---|---|
| EP | 2322431 | 5/2011 |
| EP | 2385353 | 11/2011 |
| EP | 2846126 | 3/2015 |
| EP | 2965993 | 1/2016 |

OTHER PUBLICATIONS

Office Action for EP Patent Application No. 17204353.1 dated Jun. 12, 2018.
U.S. Appl. No. 15/474,261, filed Mar. 30, 2017.
U.S. Appl. No. 15/368,288, filed Oct. 2, 2016.
European Office Action for EP Patent Application No. 17204353.1 dated Oct. 2, 2018.
European Office Action for EP Patent Application No. 17204353.1 dated Sep. 24, 2019.

* cited by examiner

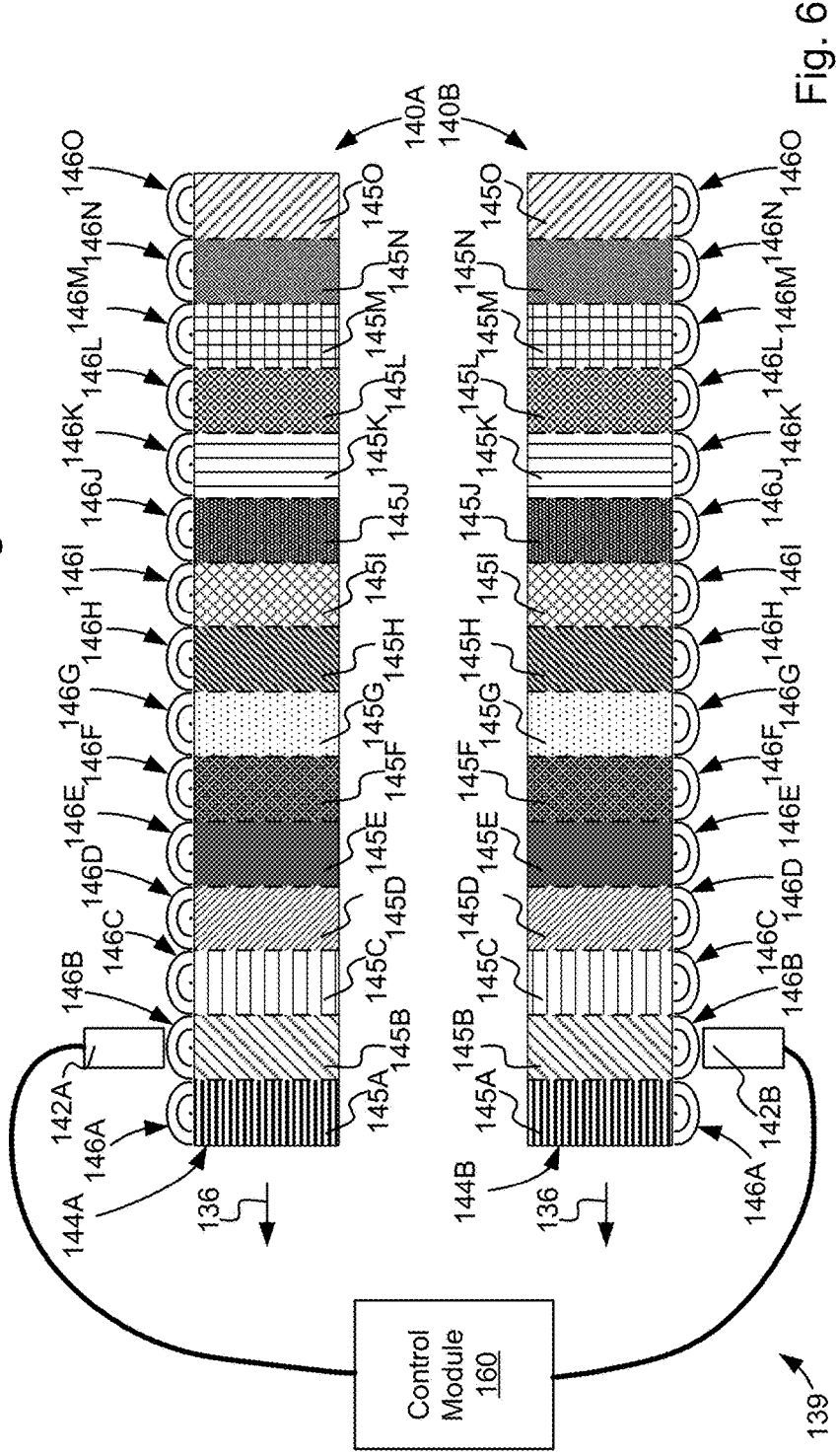

APPARATUS, SYSTEM, AND METHOD FOR DETERMINING A POSITION OF A PART

FIELD

This disclosure relates generally to sensors, and more particularly to sensors that detect a position of one part relative to another part.

BACKGROUND

Many conventional structures include parts that move or adjust relative to other parts of the structure. Often, the movement of movable parts of a system is precisely controlled. For example, aircraft include adjustable aerodynamic surfaces that are controlled to produce various effects on the aerodynamics of the aircraft. In some structures, variation of a movable part from an intended path can produce non-optimal performance.

Some aircraft manufacturers have attempted implementing position sensors to detect when an adjustable aerodynamic surface is skewing relative to an intended path. However, precisely detecting the skew of an adjustable aerodynamic surface with such conventional sensors is difficult.

SUMMARY

The subject matter of the present disclosure has been developed in response to the present state of the art, and in particular, in response to the limitations of magnetic position sensors and associated systems as described in more detail below. Accordingly, the subject matter of the present disclosure has been developed to provide apparatuses, systems, and methods for determining a position of a first part relative to a second part that overcome at least some of the above-discussed shortcomings of prior art techniques.

Disclosed herein is an apparatus for determining a position of a first part relative to a second part. The first part is movable relative to the second part. The apparatus comprises a magnetic position indicator and a magnetic field sensor. The magnetic position indicator is non-movably fixed to the first part and comprises a plurality of magnetic field sources positioned along a length of the magnetic position indicator. Each magnetic field source of the plurality of magnetic field sources generates a magnetic field having a unique magnetic signature. The magnetic field sensor is non-movably fixed to the second part and configured to detect the unique magnetic signatures of the magnetic fields generated by the plurality of magnetic field sources of the magnetic position indicator. The preceding subject matter of this paragraph characterizes example 1 of the present disclosure. Unless otherwise noted, as defined herein a plurality of magnetic field sources does not necessarily mean every magnetic field source of an entire set or class of magnetic field sources. Rather, a plurality of magnetic field sources can be defined as fewer than all (but at least two) of the magnetic field sources of an entire set or class of magnetic field sources. Moreover, unless otherwise noted, as defined herein a plurality of particular features does not necessarily mean every particular feature of an entire set or class of the particular features.

The plurality of magnetic field sources are positioned consecutively along the length of the magnetic position indicator. The preceding subject matter of this paragraph characterizes example 2 of the present disclosure, wherein example 2 also includes the subject matter according to example 1, above.

Each magnetic field source of the plurality of magnetic field sources has permanent magnetic properties that are different than any other magnetic field source of the plurality of magnetic field sources. The preceding subject matter of this paragraph characterizes example 3 of the present disclosure, wherein example 3 also includes the subject matter according to any one of examples 1 or 2, above.

Each magnetic field source of the plurality of magnetic field sources has a unique pole pattern comprising a north pole region and a south pole region. The preceding subject matter of this paragraph characterizes example 4 of the present disclosure, wherein example 4 also includes the subject matter according to any one of examples 1-3, above.

Orientations of the north pole regions and the south pole regions of the magnetic field sources reversibly alternate along the magnetic position indicator. The preceding subject matter of this paragraph characterizes example 5 of the present disclosure, wherein example 5 also includes the subject matter according to example 4, above.

Each unique magnetic signature comprises at least one of a magnetic field magnitude that is different than a magnetic field magnitude of any other unique magnetic signature, a magnetic field shape that is different than a magnetic field shape of any other unique magnetic signature, a magnetic field depth that is different than a magnetic field depth of any other unique magnetic signature, or a location of a center of the magnetic field that is different than a location of the center of the magnetic field of any other unique magnetic signature. The preceding subject matter of this paragraph characterizes example 6 of the present disclosure, wherein example 6 also includes the subject matter according to any one of examples 1-5, above.

The magnetic field sensor is configured to isolate the unique magnetic signature of a magnetic field in closest proximity to the sensor from the unique magnetic signatures of all other magnetic fields. The preceding subject matter of this paragraph characterizes example 7 of the present disclosure, wherein example 7 also includes the subject matter according to any one of examples 1-6, above.

The magnetic position indicator comprises a single continuous magnetic material having a magnetic pattern, sequentially changing along the length of the magnetic position indicator, formed in the single continuous magnetic material and defining the plurality of magnetic field sources. The preceding subject matter of this paragraph characterizes example 8 of the present disclosure, wherein example 8 also includes the subject matter according to any one of examples 1-7, above.

The magnetic field sensor has a size equal to or smaller than each of the magnetic field sources. The first part is movable relative to the second part such that the magnetic field sensor is movable along the length of the magnetic position indicator. The preceding subject matter of this paragraph characterizes example 9 of the present disclosure, wherein example 9 also includes the subject matter according to any one of examples 1-8, above.

Also disclosed is a system for determining a positional relationship between a first part and a second part. The first part is movable relative to the second part. The system comprises a first magnetic position indicator, a first magnetic field sensor, and a position module. The first magnetic position indicator is non-movably fixed to one of the first part at a first location of the first part or the second part at a second location of the second part. The first magnetic position indicator comprises a plurality of first magnetic field sources positioned along a length of the first magnetic position indicator. Each first magnetic field source of the plurality of first magnetic field sources generates a first magnetic field having a first unique magnetic signature. The first magnetic field sensor is non-movably fixed to the other one of the first part at the first location of the first part or the second part at the second location of the second part. Additionally, the first magnetic field sensor is configured to detect the first unique magnetic signatures of the first magnetic fields generated by the plurality of first magnetic field sources of the first magnetic position indicator. The position module is configured to receive a detected first unique magnetic signature from the first magnetic field sensor and to determine a first position of the first part relative to the second part based on the detected first unique magnetic signature. The preceding subject matter of this paragraph characterizes example 10 of the present disclosure.

The position module is further configured to determine the first position of the first part relative to the second part based on the detected first unique magnetic signature without reliance on previously detected first unique magnetic signatures and without reliance on a known direction of movement of the first part relative to the second part. The preceding subject matter of this paragraph characterizes example 11 of the present disclosure, wherein example 11 also includes the subject matter according to example 10, above.

The position module stores positional data correlates a respective one of a plurality of different positions of the first part relative to the second part to each of the first unique magnetic signatures of the first magnetic fields. The preceding subject matter of this paragraph characterizes example 12 of the present disclosure, wherein example 12 also includes the subject matter according to any one of examples 10 or 11, above.

The system further comprises a second magnetic position indicator that is non-movably fixed to one of the first part at a third location of the first part or the second part at a fourth location of the second part. The second magnetic position indicator comprises a plurality of second magnetic field sources positioned along a length of the second magnetic position indicator. Each second magnetic field source of the plurality of second magnetic field sources generates a second magnetic field having a second unique magnetic signature. The system also comprises a second magnetic field sensor that is non-movably fixed to the other one of the first part at the third location of the first part or the second part at the fourth location of the second part. The second magnetic field sensor is configured to detect the second unique magnetic signatures of the second magnetic fields generated by the plurality of second magnetic field sources of the second magnetic position indicator. The position module is further configured to receive a detected second unique magnetic signature from the second magnetic field sensor and to determine a second position of the first part relative to the second part based on the detected second unique magnetic signature. The preceding subject matter of this paragraph characterizes example 13 of the present disclosure, wherein example 13 also includes the subject matter according to any one of examples 10-12, above.

The system further comprises an aspect module that is configured to determine at least one of an orientation, angular motion, or skew of the first part relative to the second part based on a comparison between the first position and the second position determined by the position module. The preceding subject matter of this paragraph characterizes example 14 of the present disclosure, wherein example 14 also includes the subject matter according to example 13, above.

The aspect module is further configured to determine the at least one of the orientation, angular motion, or skew of the first part relative to the second part based on a difference between the first position and the second position determined by the position module. The preceding subject matter of this paragraph characterizes example 15 of the present disclosure, wherein example 15 also includes the subject matter according to example 14, above.

The system further comprises an aircraft, comprising the first part and the second part. The preceding subject matter of this paragraph characterizes example 16 of the present disclosure, wherein example 16 also includes the subject matter according to any one of examples 10-15, above.

Additionally disclosed herein is a method of determining a positional relationship between a first part and a second part. The first part is movable relative to the second part. The method comprises generating a first magnetic field at a first location and generating a second magnetic field at a second location. A magnetic signature of the first magnetic field is different than a magnetic signature of the second magnetic field. The method also includes detecting the magnetic signature of one of the first magnetic field or the second magnetic field. The method further includes determining a first position of the first part relative to the second part based on a detected magnetic signature of one of the first magnetic field or the second magnetic field. The preceding subject matter of this paragraph characterizes example 17 of the present disclosure.

The first location is immediately adjacent the second location. The preceding subject matter of this paragraph characterizes example 18 of the present disclosure, wherein example 18 also includes the subject matter according to example 17, above.

The method further comprises generating a third magnetic field at a third location and generating a fourth magnetic field at a fourth location. The third location is immediately adjacent the fourth location, the third location and fourth location are spaced away from the first location and the second location, and a magnetic signature of the third magnetic field is different than a magnetic signature of the fourth magnetic field. The method also includes detecting the magnetic signature of one of the third magnetic field or the fourth magnetic field. The method additionally includes determining a second position of the first part relative to the second part based on a detected magnetic signature of one of the third magnetic field or the fourth magnetic field. The preceding subject matter of this paragraph characterizes example 19 of the present disclosure, wherein example 19 also includes the subject matter according to any one of examples 17 or 18, above.

The method also comprises determining one of an orientation, an angular motion, or a skew of the first part relative to the second part based on a comparison between the first position and the second position. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 5 is a position chart with positional data that assigns different part positions to different magnetic fields, according to one or more examples of the present disclosure;

FIG. 6 is a schematic plan view of a system having multiple position sensors, according to one or more examples of the present disclosure;

DETAILED DESCRIPTION

Figure 1:
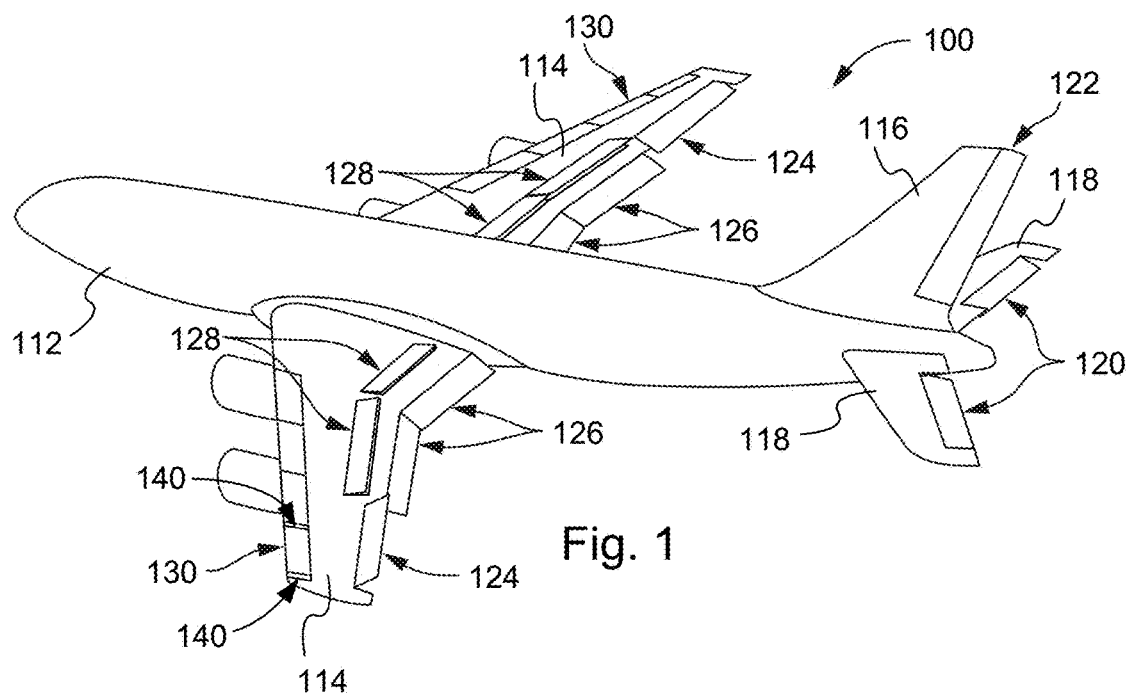
FIG. 1 is a schematic perspective view of an aircraft, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Some conventional position sensors for determining the position or skew of a part include magnets that are spaced apart along the part at discrete equidistant intervals. Such conventional position sensors further include a magnetic field sensor configured to sense the presence of a magnetic field generated by one of the magnets. The magnets are configured exactly the same to generate respective magnetic fields that also are exactly the same. In other words, the magnetic signatures of the magnetic fields generated by the magnets of conventional position sensors are the same. The magnets are spaced apart so that the magnetic fields generated by the magnets do not overlap at the magnetic field sensor and prevent the magnetic field sensor from distinguishing the magnetic fields of adjacent magnets. In other words, the magnets are spaced apart to define spaces between the magnetic fields generated by the magnets.

For conventional position sensors, the magnetic field sensor detects when a magnet has passed by the sensor by detecting the presence and absence of a magnetic field generated by the magnet. The position sensor then determines a position of the part by counting the number of magnets detected by or passing by the magnetic field sensor. However, because conventional position sensors merely detect the presence or absence of a magnetic field of many identical magnetic fields, conventional position sensors must keep track of how many magnets have been detected and the direction the part is moving to determine the position of the part. Accordingly, conventional position sensors store a history of previously detected magnets and use means for knowing the direction of the part when the part moves. These sensor qualities increase the components necessary to detect the position of a part.

Also, the precision of conventional position sensors at detecting the position of the part is limited due to the above-mentioned need to space the magnets apart from each other. In theory, the closer the magnets are to each other, the more precise the position sensor. However, because smaller spacing between magnets of conventional position sensors negatively affects the operability of the position sensors, these position sensors are unable to precisely detect the position of a part.

In contrast to conventional position sensors, the position sensors and associated systems and methods of the present disclosure are able to precisely detect positional characteristics of a part without a history of previously detected magnets and without knowing a direction of movement of the part. For example, the magnet of the position sensors of the present disclosure produces magnetic fields with unique magnetic signatures, which allows the position sensors to detect a position of a part based exclusively on the latest detection of a single magnetic field. Furthermore, in some embodiments, the magnet of the position sensors of the present disclosure includes multiple magnetic field sources that are not spaced apart, but rather are immediately adjacent each other, such that the position sensors are able to more precisely detect the position of a part compared to conventional position sensors.

Referring to FIG. 1, one embodiment of an aircraft 100 is shown. The aircraft 100 can be any of various types of aircraft, such as commercial aircraft used for the transportation of passengers, military aircraft for military operations, personal aircraft, and the like. Moreover, although an aircraft is depicted in the illustrated embodiments, in other embodiments, another structure, such as a vehicle (e.g., helicopter, boat, spacecraft, automobile, etc.) or non-mobile complex structure (e.g., building, bridge, machinery, etc.), with any of various adjustable elements, can be used instead of the aircraft 100.

The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116. The aircraft 100 can be any of various types of aircraft, such as a passenger airplane, a fighter jet, a helicopter, spacecraft, and the like. As depicted, the aircraft 100 represents a passenger airplane.

The aircraft 100 further includes a plurality of adjustable parts, which can be adjustable aerodynamic surfaces or control surfaces that are adjustable to change the characteristics of air flow over, around, and trailing the surfaces. For example, each wing 114 includes an aileron 124, flaps 126, spoilers 128, and slats 130. Additionally, the vertical stabilizer 116 includes a rudder 122, and each horizontal stabilizer 118 includes an elevator 120. For responsive control of the flight of the aircraft 100, the relative position of the adjustable aerodynamic surfaces of the aircraft 100, such as those shown in FIG. 1, are adjustable. The aircraft 100 includes systems (e.g., actuator systems), such as actuator system 132 shown in FIG. 2, for adjusting the position of adjustable aerodynamic surfaces, such as the slat 130, relative to other surfaces. For reference, an adjustable aerodynamic surface can be defined as a first part and the surface relative to which the adjustable aerodynamic surface moves can be defined as a second part, or vice versa, such that the adjustable aerodynamic surface is defined as the second part and the surface relative to which the adjustable aerodynamic surface moves is defined as the first part. In the illustrated example of FIG. 2, the first part or second part is one of the slats 130 and the other of the first part or second part is the wing 114 to which the slat 130 is movably coupled. However, in other examples, the first part or second part is another adjustable aerodynamic surface (e.g., ailerons 124, spoilers 128, rudder 122, or elevators 120) and the other of the first part or second part is the wing 114, the vertical stabilizer 116, or the horizontal stabilizer 118 to which the adjustable aerodynamic surface is movable coupled. Although the adjustable elements have been described as adjustable aerodynamic surfaces of an aircraft, it is recognized that in other embodiments, the adjustable elements can be any of various other adjustable surfaces or adjustable components of an aircraft or other structure.

The actuator system 132 can be any of various actuator systems for adjusting the position of an adjustable aerodynamic surfaces or other adjustable part. For example, the system 132 can be a mechanical, hydraulic, and/or pneumatic controlled actuator system.

Figure 3:
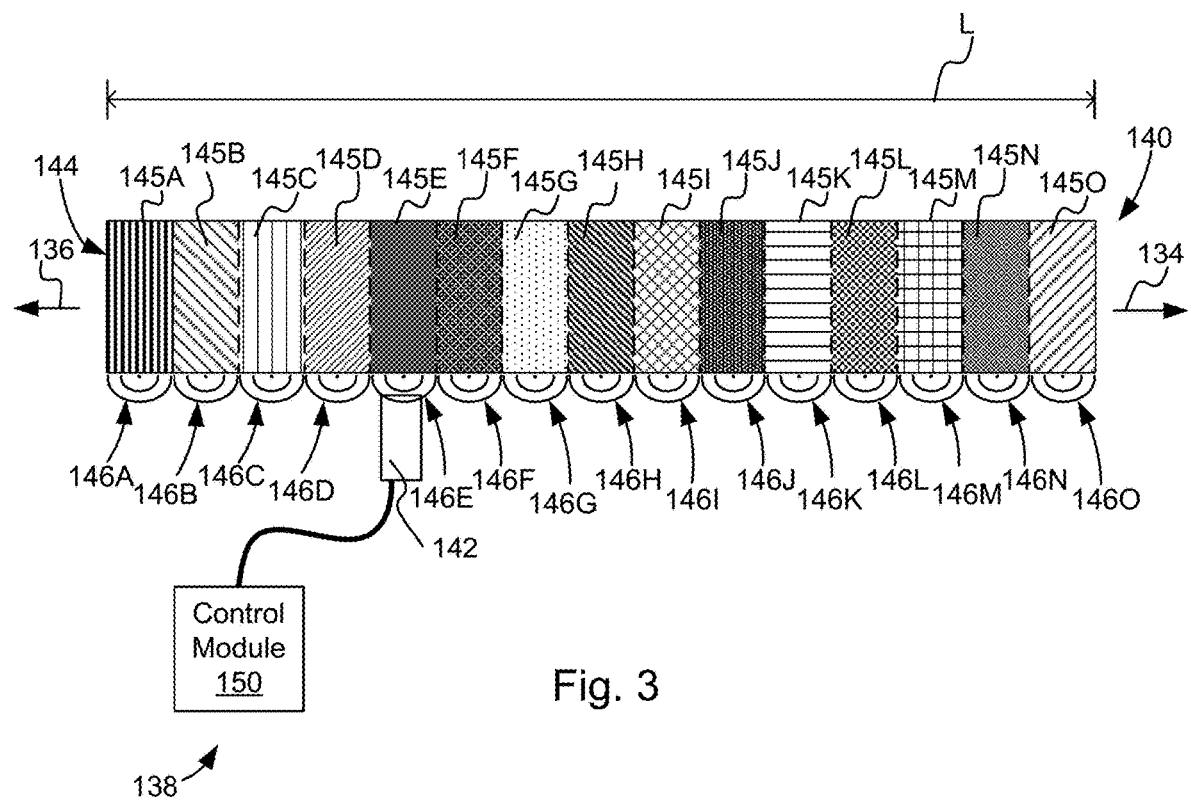
FIG. 3 is a schematic plan view of a system having a position sensor, according to one or more examples of the present disclosure.

The aircraft 100 includes a system 138, as shown in FIG. 3, for determining a positional relationship between the slat 130 (e.g., first part) and the wing 114 (e.g., second part). The system 138 includes at least one position sensor 140 configured to determine a position of the slat 130 relative to the wing 114, which, as defined herein, is the equivalent of determining the position of the wing 114 relative to the slat 130. In other words, determining the position of the slat 130 relative to the wing 114 also determines the position of the wing 114 relative to the slat 130. In the illustrated embodiment, the system 138 includes two position sensors 140 located proximate opposing end portions 135, 137 of the slat 130, respectively. Each position sensor 140 is operable to determine the position of a respective one of the opposing end portions 135, 137 relative to the wing 114. By knowing the position of two or more locations of a first part relative to a second part, positional aspect information, such as skew, orientation, and angular motion, of the first part relative to the second part can be determined. For example, as will be explained in more detail below, knowing the position of the opposing end portions 135, 137 relative to the wing 114 allows the system 138 to determine a positional aspect, such as skew, orientation, and/or angular motion, of the first part relative to the second part. Initially, however, features of the position sensor 140 and its ability to detect a position of the slat 130 will now be explained in more detail.

Figure 2:
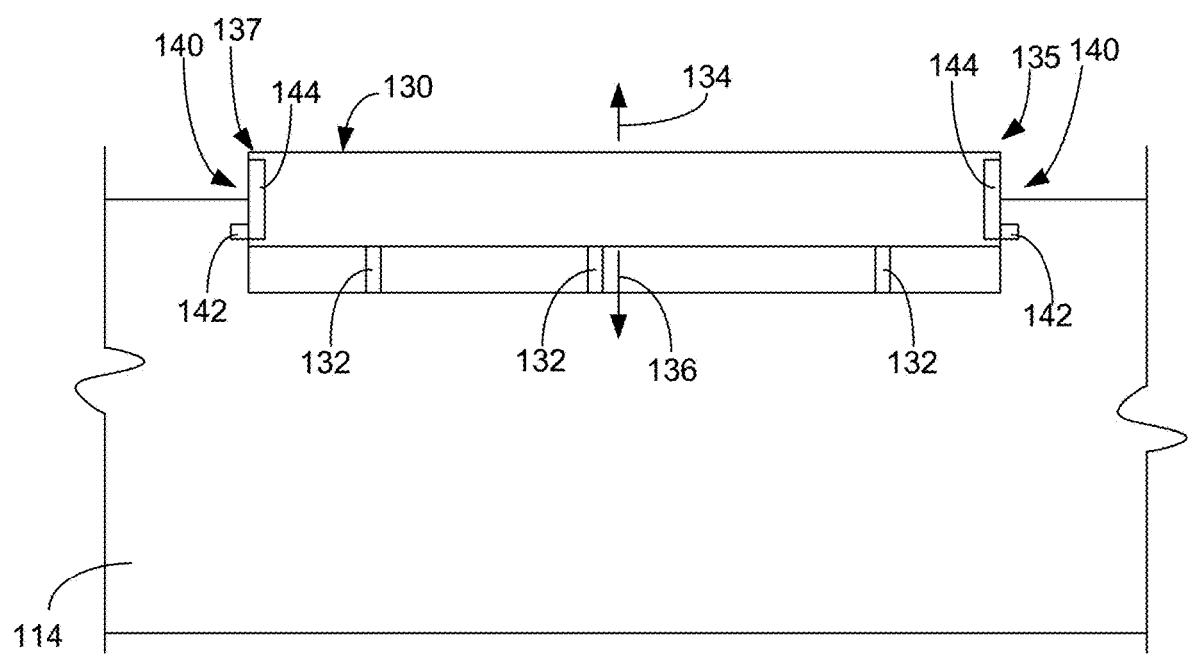
FIG. 2 is a schematic plan view of a slat, a wing, and position sensors for determining a position of the slat relative to the wing, according to one or more examples of the present disclosure.

Referring to FIGS. 2 and 3, the position sensor 140 includes a magnetic position indicator 144 and a magnetic field sensor 142. In the illustrated embodiment, the magnetic position indicator 144 is non-movably fixed to the slat 130, such as to one of the end portions 135, 137 of the slat 130, and the magnetic field sensor 142 is non-movably fixed to the wing 114. In other words, the magnetic position indicator 144 is non-movably fixed to an articulating member where monitoring of the position of the articulating member relative to a non-articulating member, to which the magnetic field sensor 142 is non-movably fixed is desired. However, in other embodiments, the position of an articulating member (e.g., the slat 130) relative to a non-articulating member (e.g., the wing 114) can be monitored by non-movably fixing the magnetic position indicator 144 to the non-articulating member and non-movably fixing the magnetic field sensor 142 to the articulating member.

The actuator system 132 is actuatable (e.g., selectively operable, interconnected, slaved, etc.) to move the slat 130 linearly relative to the wing 114 in an extension direction 134 from a fully retracted or semi-retracted position to a fully extended or semi-extended position and in a retraction direction 136 from the fully extended or semi-extended position to the fully retracted or semi-retracted position. As the slat 130 moves relative to the wing 114 in either the extension direction 134 or the retraction direction 136, the magnetic position indicator 144 moves relative to the magnetic field sensor 142. The magnetic position indicator 144 is fixed to the slat 130 and the magnetic field sensor 142 is fixed to the wing 114 at respective locations such that the magnetic field sensor 142 is in close enough proximity to the magnetic position indicator 144 to detect magnetic fields being generated by the magnetic position indicator 144. Moreover, the magnetic position indicator 144 is fixed to the slat 130 and the magnetic field sensor 142 is fixed to the wing 114 at respective locations such that a distance between the magnetic field sensor 142 and the magnetic position indicator 144 is constant as the magnetic position indicator 144 moves relative to the magnetic field sensor 142.

Referring to FIG. 3, the magnetic position indicator 144 of the position sensor 140 includes a plurality of magnetic field sources 145A-145O. Each of the magnetic field sources 145A-145O generates a corresponding magnetic field of a plurality of magnetic fields 146A-146O. For example, the magnetic field source 145A generates the magnetic field 146A, the magnetic field source 145B generates the magnetic field 146B, and so on. The magnetic position indicator 144 is elongate and the magnetic field sources 145A-145O are positioned along a length L of the magnetic position indicator 144. Furthermore, in the illustrated embodiments, the magnetic field sources 145A-145O are positioned consecutively such that they are not spaced apart from each other. In other words, there is no gap or free space between adjacent magnetic field sources of the magnetic field sources 145A-145O. The magnetic field sources 145A-145O are shown separated by imaginary dashed lines to show a general demarcation between the magnetic field sources. In some implementations, there is not a distinct boundary between adjacent magnetic field sources. Furthermore, although the magnetic position indicator 144 of the illustrated embodiment has fifteen magnetic field sources 145A-145O corresponding to fifteen different positions, as will be explained in more detail below, in other embodiments, the magnetic position indicator can have fewer or more than fifteen magnetic field sources as desired.

Although the magnetic field sources 145A-145O shown in the figures are positioned consecutively such that there is no gap, free space, or non-magnetic material between adjacent magnetic field sources of the magnetic field sources 145A-145O, in other embodiments, gaps, free spaces, or non-magnetic materials can be positioned between the magnetic field sources 145A-145O.

Each of the magnetic field sources 145A-145O is configured differently than any other of the magnetic field sources 145A-145O to generate a magnetic field with a unique magnetic signature. In other words, each of the magnetic fields 146A-146O has a unique magnetic signature that is different than the magnetic signature of any other of the magnetic fields 146A-146O. Accordingly, each of the magnetic fields 146A-146O identifies the respective one of the magnetic field sources 145A-145O that generates the magnetic field based on the unique magnetic signature of the magnetic field. For example, the magnetic signature of the magnetic field 146A is unique because the magnetic signature of the magnetic field 146A is different than the magnetic signature of the magnetic field 146B, the magnetic field 146C, and all other magnetic fields of the position sensor 140.

The magnetic signature of a magnetic field is defined by one or more characteristics of magnetic fields. A magnetic signature is unique relative to other magnetic signatures if at least one of the characteristics defining the magnetic signature is different than the other magnetic signatures. For example, the magnitude (e.g., power) of a magnetic field is a characteristic type that at least partially defines the magnetic signature of the magnetic field, and the characteristics of two magnetic fields are different if the values of the magnitudes of the two magnetic fields are different.

According to one embodiment, the magnetic signatures of all the magnetic fields 146A-146O have a magnetic field magnitude (i.e., magnitude of the magnetic field) that is measurable or detectable by the magnetic field sensor 142. In such an embodiment, the magnetic field magnitude (i.e., the value of the magnetic field magnitude) for any given magnetic field is different than the magnetic field magnitude of any other of the magnetic fields. In other words, one magnetic field is either stronger or weaker than any other magnetic field. In this manner, each unique magnetic signature comprises a magnetic field magnitude that is different than the magnetic field magnitude of any other unique magnetic signature.

According to yet another embodiment, the magnetic signatures of all the magnetic fields 146A-146O have a magnetic field shape that is measurable or detectable by the magnetic field sensor 142. In such an embodiment, the magnetic field shape (e.g., a value for the location of the poles, a value for the orientation of the poles, a value for the number of lobes of the magnetic field, etc.) for any given magnetic field is different than the magnetic field shape of any other of the magnetic fields. In this manner, each unique magnetic signature comprises a magnetic field shape that is different than the magnetic field shape of any other unique magnetic signature.

According to a further embodiment, the magnetic signatures of all the magnetic fields 146A-146O have a magnetic field depth that is measurable or detectable by the magnetic field sensor 142. In such an embodiment, the magnetic field depth (e.g., a value for the magnetic field gradient, a value of the rate of change of the magnetic field magnitude, etc.) for any given magnetic field is different than the magnetic field depth of any other of the magnetic fields. In this manner, each unique magnetic signature comprises a magnetic field depth that is different than the magnetic field depth of any other unique magnetic signature.

In another embodiment, the magnetic signatures of all the magnetic fields 146A-146O have a location of a center of the magnetic field that is measurable or detectable by the magnetic field sensor 142. In such an embodiment, the location of the center of the magnetic field (e.g., a value of the location of magnetic field relative to the sensor 142) for any given magnetic field is different than the location of the center of the magnetic field of any other of the magnetic fields. In this manner, each unique magnetic signature comprises a location of the center of the magnetic field that is different than the location of the center of the magnetic field of any other unique magnetic signature.

Although each of the above embodiments establish unique magnetic signatures of the magnetic fields 146A-146O using respective ones of four characteristics of magnetic fields, in other embodiments, the unique magnetic signatures can be established using two or more of the four characteristics or any other characteristics of magnetic fields (e.g., magnetic flux density, magnetic field direction, etc.).

According to one embodiment, the magnetic position indicator 144 is made of a single, continuous magnetic material having a magnetic pattern formed in the magnetic material. In other words, the magnetic position indicator 144 has a one-piece, unitary construction. In some implementations, the magnetic position indicator 144 is made of a single piece of permanent magnetic material, such as any of various ferromagnetic materials (e.g., iron, nickel, cobalt, etc.), that has been magnetized. For example, in one implementation, the magnetic position indicator 144 is a single piece of permanent magnetic material with magnetic properties that have been permanently physically altered, such as via doping, etching, imprinting, sintering, and the like, at each of the magnetic field sources 145A-145O in a unique way to produce the magnetic fields 146A-146O with the unique magnetic signatures. As one example, the polarity of a given one of the magnetic field sources 145A-145O can be reversed compared to another of the magnetic field sources 145A-145O. In some implementations, the magnetic properties that have been permanently physically altered can be re-altered or adjusted with enough effort.

In one embodiment, each of the magnetic field sources 145A-145O has a north pole region and a south pole region. The properties or characteristics of either one or both of the north pole region and the south pole region of the magnetic field sources 145A-145O are different than each other to produce different magnetic fields. In one implementation, the orientations of the north pole regions and the south pole regions of the magnetic field sources reversibly alternate along the magnetic position indicator. Accordingly, the same surface of the magnetic position indicator may have both north poles and south poles. For example, the magnetic field source 145A may have an N-S orientation, the magnetic field source 145B may have an S-N orientation, and the magnetic field source 145C may have a N-S orientation. The remaining magnetic field sources 145D-145O may follow a similar pattern. In such an alternating implementation, the magnetic field 146A is generated by the north pole region and the south pole region of the magnetic field source 145A, the magnetic field 146B is generated by the north pole region of the magnetic field source 145A and the south pole region of the magnetic field source 145B, the magnetic field 146C is generated by the south pole region of the magnetic field source 145B and the north pole region of the magnetic field source 145C, and so forth. Alternating the north pole regions and south pole regions across the same surfaces promotes precisely controlled magnetic fields with limited reach or depth such that magnetic fields generated by adjacent magnetic sources do not overlap or do not overlap enough to affect the ability of the magnetic field sensor 142 to detect one magnetic field at a time.

The magnetic position indicator 144 also has a depth or thickness. The magnetic field sources 145A-145O can be formed by uniquely physically altering the magnetic material along a depth of the material at respective ones of the magnetic field sources 145A-145O. For example, the magnetic material at a given one of the magnetic field sources 145A-145O can be physically altered to be more magnetized at a front surface of the material to generate a more powerful magnetic field at the front surface of the magnetic material than at a back surface of the magnetic material compared to another magnetic field source. However, in alternative implementations, the magnetic position indicator 144 is made of a single piece of non-permanent magnetic material or electromagnetic material. In such alternative implementations, the respective magnetic fields 146A-146O are generated by separately running a current through the respective magnetic field sources 145A-145O.

Based on the foregoing, the magnetic pattern of the magnetic position indicator 144 is defined by the different physical make-up or configuration of the magnetic field sources 145A-145O. More specifically, the magnetic pattern sequentially changes along the length of the magnetic position indicator in correspondence with the changes of the physical make-up or configuration of the magnetic field sources 145A-145O along the magnetic position indicator 144. In other words, each change in the magnetic pattern is represented by one of the respective magnetic field sources 145A-145O. According to one embodiment, the magnetic position indicator 144 can be similar to a so-called Polymagnet® manufactured by Correlated Magnetics Research, LLC of Huntsville, Ala.

Referring again to FIG. 3, the magnetic field sensor 142 is positioned in close proximity to the magnetic position indicator 144 such that at any given time at least a portion of the magnetic field generated by one of the magnetic field sources 145A-145O is received and detected by the magnetic field sensor 142. The magnetic field sensor 142 has at least one receptor that is sensitive to magnetic fields and capable of isolating (e.g., distinguishing) at least one characteristic of the magnetic field. For example, in the presence of a magnetic field, the at least one receptor may promote the flow of electrons at a flow rate proportional to the magnitude of the magnetic field. As another example, in the presence of a magnetic field, the at least one receptor may promote the flow of electrons in a direction corresponding with the direction of the magnetic field. The characteristics of the flow of electrons are converted into an electric signal representative of the characteristics of the flow of electrons, which are in turn representative of the characteristics of a sensed magnetic field. The electric signal (i.e., sensor signal) is then utilized by the control module 150 to determine the position of a first part (e.g., the slat 130) relative to a second part (e.g., the wing 114). The magnetic field sensor 142 includes a magnetometer, such as any of various magnetometers known in the art, in some implementations. Although not necessary, in some embodiments, the magnetic field sensor 142 is sized to have a receptor area that is equal to or smaller than the area of the surface of each magnetic field source facing the magnetic field sensor 142 to facilitate one-at-a-time detection of the magnetic fields by the magnetic field sensor 142.

According to one embodiment, the magnetic field sensor 142 includes an array of magnetometers. The outputs of the array of magnetometers are combined to produce a 2-dimensional map of the magnetic field state at a given position. In other embodiments, the magnetic field sensor 142 is a load sensor attached to a ferromagnetic or similar material that measures forces in three dimensions, which provides an indication of a magnetic center at a given position. Alternatively, the load sensor may measure force in a single direction facing the magnetic position indicator 144, which provides an indication of the local magnitude of the magnetic force at a given position.

Figure 4:
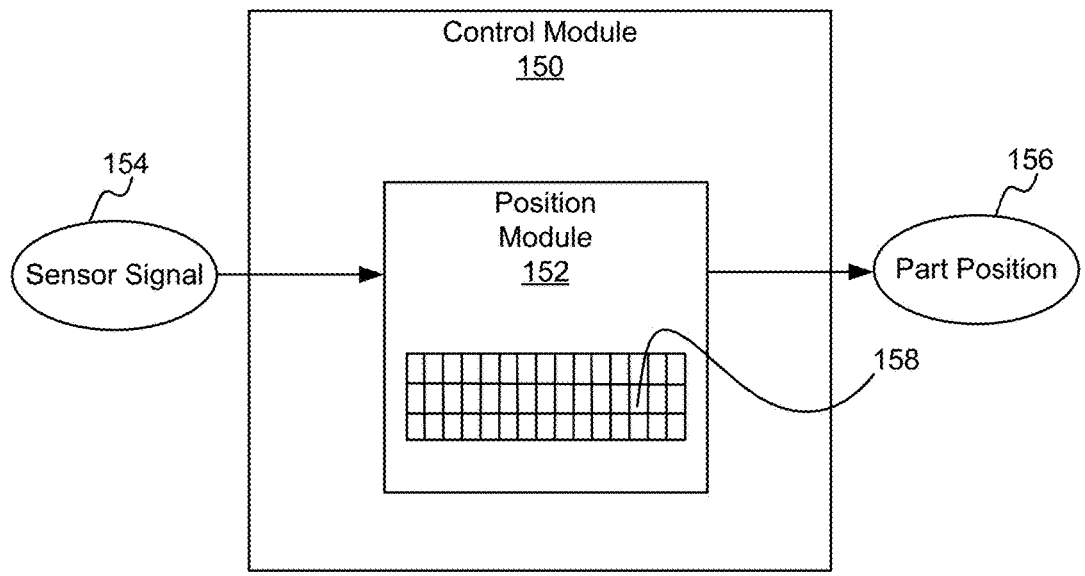
FIG. 4 is a schematic block diagram of a control module of a system for determining a positional relationship between a first part and a second part, according to one embodiment.

The system 138 further includes the control module 150, which receives a sensor signal 154 from the magnetic field sensor 142 (see, e.g., FIG. 4). As illustrated in FIG. 3, in one example, the control module 150 is separate from the magnetic field sensor 142 and electrically coupled to the magnetic field sensor 142 via a cable or wire to receive the sensor signal 154. However, in other examples, the control module 150 forms part of the magnetic field sensor 142 or vice versa such that the control module 150 and the magnetic field sensor 142 are integrated into a single unit or fit within the same enclosure. The control module 150 includes at least one of logic hardware and executable code, the executable code being stored on one or more memory devices. The executable code may be replaced with a computer processor and computer-readable storage medium that stores executable code executed by the processor.

Referring to FIG. 4, the control module 150 includes a position module 152 that is configured to receive a detected unique magnetic signature from the magnetic field sensor 142 and to determine a part position 156 based on the detected unique magnetic signature. In the illustrated embodiment, the part position 156 is the position of the slat 130 relative to the wing 114. However, as presented above, the part position 156 can be the position of any of various parts, control surfaces, components, devices, elements, and the like. The sensor signal 154 represents the detected unique magnetic signature by indicating a characteristic that is unique to only one of the magnetic fields 146A-146O. The position module 152 first determines the magnetic field source that generated the unique magnetic signature detected by the sensor signal 154. Accordingly, the position module 152 stores predetermined positional data 158 in a database or memory, which is shown in the form of a chart in FIGS. 4 and 5. The positional data 158 correlates the unique magnetic signatures to their respective magnetic field sources 145A-145O. The unique magnetic signatures are represented by the letters A-O in the positional data 158. Additionally, the positional data 158 correlates the magnetic field sources 145A-145O to respective positions of the slat 130 relative to the wing 114. The positions of the slat 130 relative to the wing 114 are represented by the numbers 0-14 in the positional data 158. Although not shown, the positions 0-14 of the slat 130 can be further correlated to additional useful information as desired, such as percent extended/retracted or dimensional values. The respective positions of the slat 130 relative to the wing 114 are tied to the locations of the magnetic field sources 145A-145O on the slat 130 relative to the location of the magnetic field sensor 142 on the wing 114.

As mentioned above, the positional data 158 is predetermined. For example, the positions 0-14 are tied to known positions of the slat 130 relative to the wing 114. Generally, in one implementation, the position 0 is associated with a fully retracted position of the slat 130, the position 14 is associated with a fully extended position of the slat 130, and the positions 1-13 are associated with intermediate or incrementally extended/retracted positions of the slat 130 relative to the wing 114. Correspondingly, the magnetic position indicator 144 is located on the slat 130 and the magnetic field sensor 142 is located on the wing 114 at respective locations that position the magnetic field sensor 142 in closest proximity to the magnetic field 146A of the magnetic field source 145A when the slat 130 is in the fully retracted position. In contrast, the magnetic position indicator 144 is located on the slat 130 and the magnetic field sensor 142 is located on the wing 114 at respective locations that position the magnetic field sensor 142 in closest proximity to the magnetic field 146O of the magnetic field source 145O when the slat 130 is in the fully extended position. Moreover, the magnetic position indicator 144 is located on the slat 130 and the magnetic field sensor 142 is located on the wing 114 at respective locations that position the magnetic field sensor 142 in closest proximity to the magnetic field of the magnetic field source corresponding with the intermediate position of the slat 130.

Because each unique magnetic signature is tied to a particular one of the magnetic field sources 145A-145O and each of the magnetic field sources 145A-145O is tied to a particular position of the slat 130 relative to the wing 114, the position of the slat 130 relative to the wing 114 can be determined solely on the detection of a single one of the unique magnetic signatures. In other words, the present system 138 can determine the position of the slat 130 relative to the wing 114 based only on the real-time detection of one unique magnetic signature of a magnetic field without reliance on previously detected magnetic signatures and without reliance on a known direction of movement of the slat 130 relative to the wing 114.

Referring to FIG. 6, according to another embodiment, a system 139 is configured to determine a positional aspect of the slat 130 relative to the wing 114. The system 139 is similar to the system 138. However, instead of one position sensor, as with the system 138, the system 139 includes a first position sensor 140A and a second position sensor 140B each located proximate different locations of the slat 130. The first position sensor 140A and the second position sensor 140B are configured similarly to the position sensor 140. In fact, in one implementations, each of the first position sensor 140A and the second position sensor 140B is the same as the position sensor 140. For example, the first position sensor 140A and the second position sensor 140B include a first magnetic position indicator 144A and a second magnetic position indicator 144B, respectively, and a first magnetic field sensor 142A and a second magnetic field sensor 142B, respectively. The first position sensor 140A and the second position sensor 140B are configured to determine a first position of the slat 130 relative to the wing 114 and a second position of the slat 130 relative to the wing 114, respectively, in a manner as described above in relation to the position sensor 140. The first position is the position of the slat 130 proximate the first position sensor 140A and the second position is the position of the slat 130 proximate the second position sensor 140B. Because the first position sensor 140A and the second position sensor 140B are located at different locations of the slat 130, the first position determined by the first position sensor 140A and the second position determined by the second position sensor 140B may not be the same. For example, when the slat 130 is skewed or is configured to move other than in a linear direction, the first position and the second position would be different.

Figure 7:
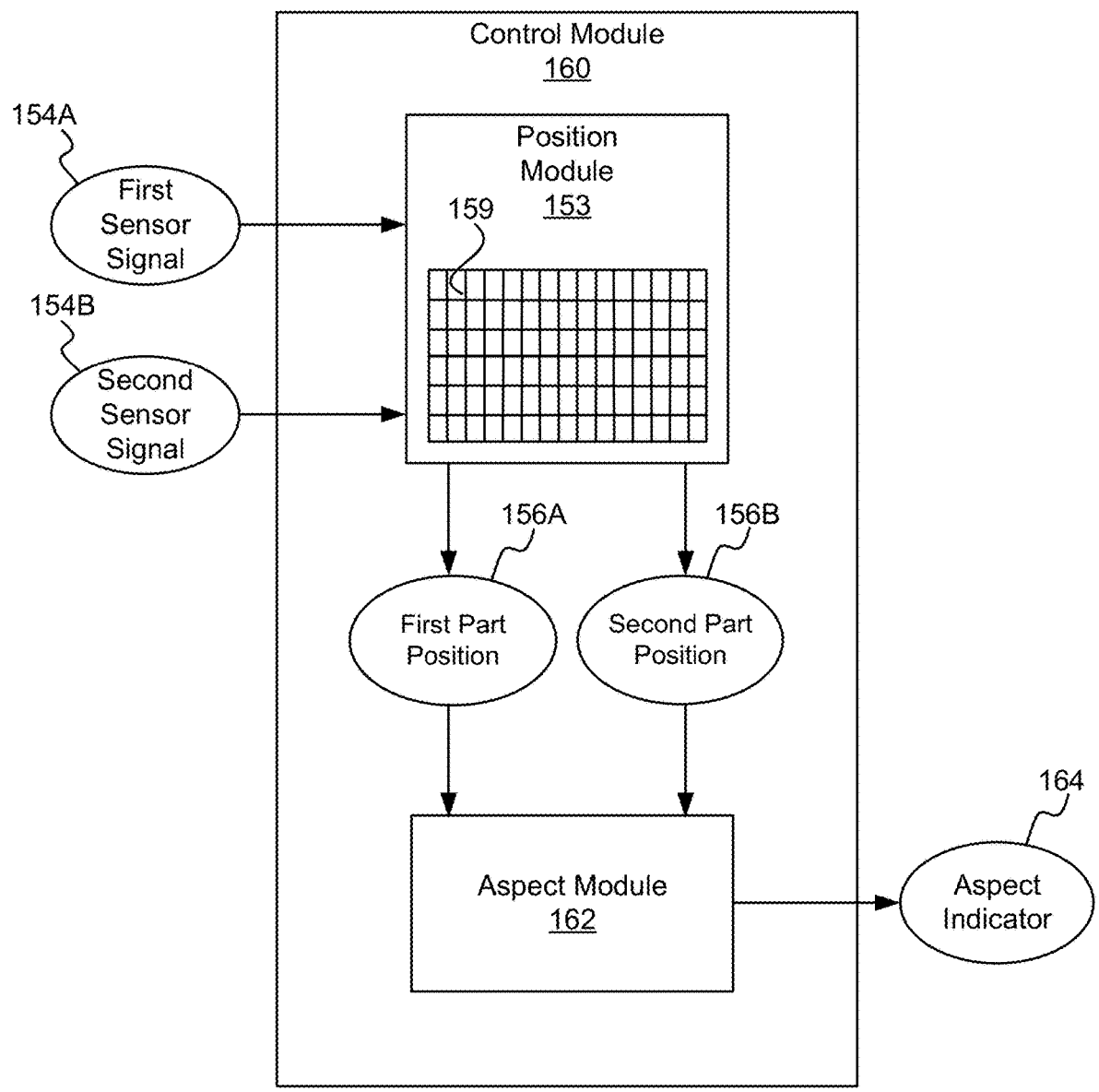
FIG. 7 is a schematic block diagram of a control module of a system for determining a positional relationship between a first part and a second part, according to one or more examples of the present disclosure.

As shown in FIG. 7, the system 139 includes a control module 160 that is similar to the control module 150. However, instead of receiving sensor signals from only one position sensor, the control module 160 receives sensor signals from two or more position sensors. For example, in the illustrated embodiment, the control module 160 receives first sensor signals 154A from the first position sensor 140A and second sensor signals 154B from the second position sensor 140B. More specifically, the control module 160 receives first sensor signals 154A from the first magnetic field sensor 142A and second sensor signals 154B from the second magnetic field sensor 142B.

The control module 160 includes a position module 153 that is configured to determine a first part position 156A (i.e., a position of a first location of a part relative to a stationary surface) based solely on a single first sensor signal 154A and a second part position 156B (i.e., a position of a second location of the part relative to a stationary surface). In the illustrated embodiment, the first part position 156A is a first position of the slat 130 relative to the wing 114 (i.e., a position of a first location of the slat 130 relative to the wing 114) and the second part position 156B is a second position of the slat 130 relative to the wing 114 (i.e., a position of a second location of the slat 130 relative to the wing 114). Like the position module 152, the position module 153 stores predetermined positional data 159 in a database or memory, which is shown in the form of a chart in FIG. 7. In a manner similar to the positional data 158, the positional data 159 correlates the unique magnetic signatures, the magnetic field sources, and the first part positions associated with the first position sensor 140A and separately correlates the unique magnetic signatures, the magnetic fields 146A-146O, the magnetic field sources 145A-145O, and the second part positions associated with the second position sensor 140B. Although the system 139 is shown as having two position sensors for monitoring the position of a part, in other embodiments, the system 139 can have three or more position sensors for more precisely monitoring the position of the part and the position module 153 can be configured to determine three or more part positions associated with each of the three or more position sensors.

The control module 160 further includes an aspect module 162 that is configured to determine a positional aspect of a part (e.g., first part) relative to another part (e.g., second part). The position aspect of a part can be one or more of a skew of the part, an orientation of the part, and an angular motion of the part relative to another part. The aspect module 162 determines the positional aspect of the part by comparing the first part position 156A to the second part position 156B. The positional aspect determined by the aspect module 162 is represented by an aspect indicator 164 that can be communicated to other systems for further processing.

Generally, the aspect module 162 determines the positional aspect of the part by monitoring differences between the first part position 156A and the second part position 156B and correlating the positional aspect to the differences. Accordingly, in some implementations, comparing the first part position 156A to the second part position 156B includes determining a difference between the first part position 156A and the second part position 156B.

Figure 8:
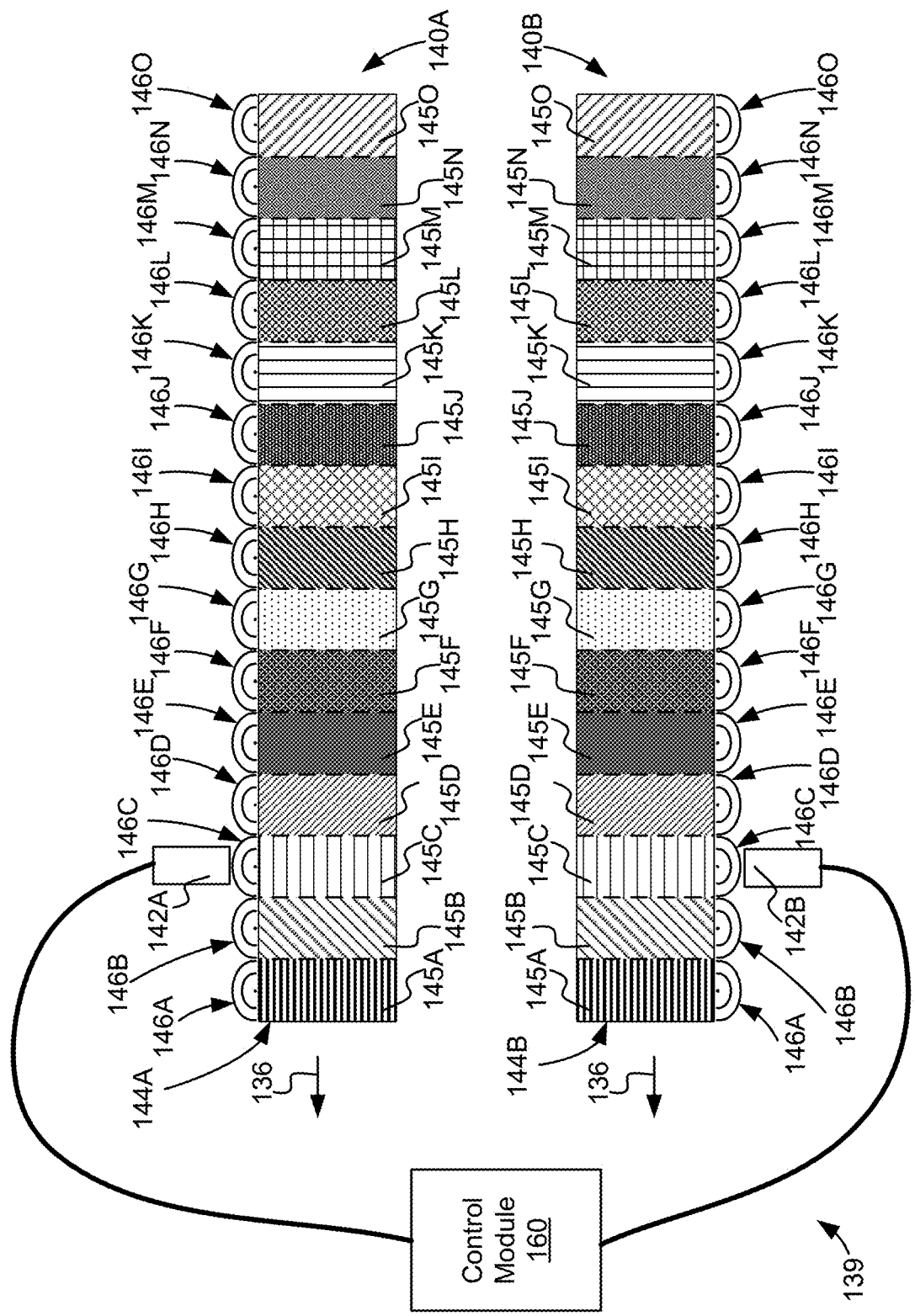
FIG. 8 is a schematic plan view of a first position sensor and a second position sensor indicating no skew of a part, according to one or more examples of the present disclosure.
Figure 9:
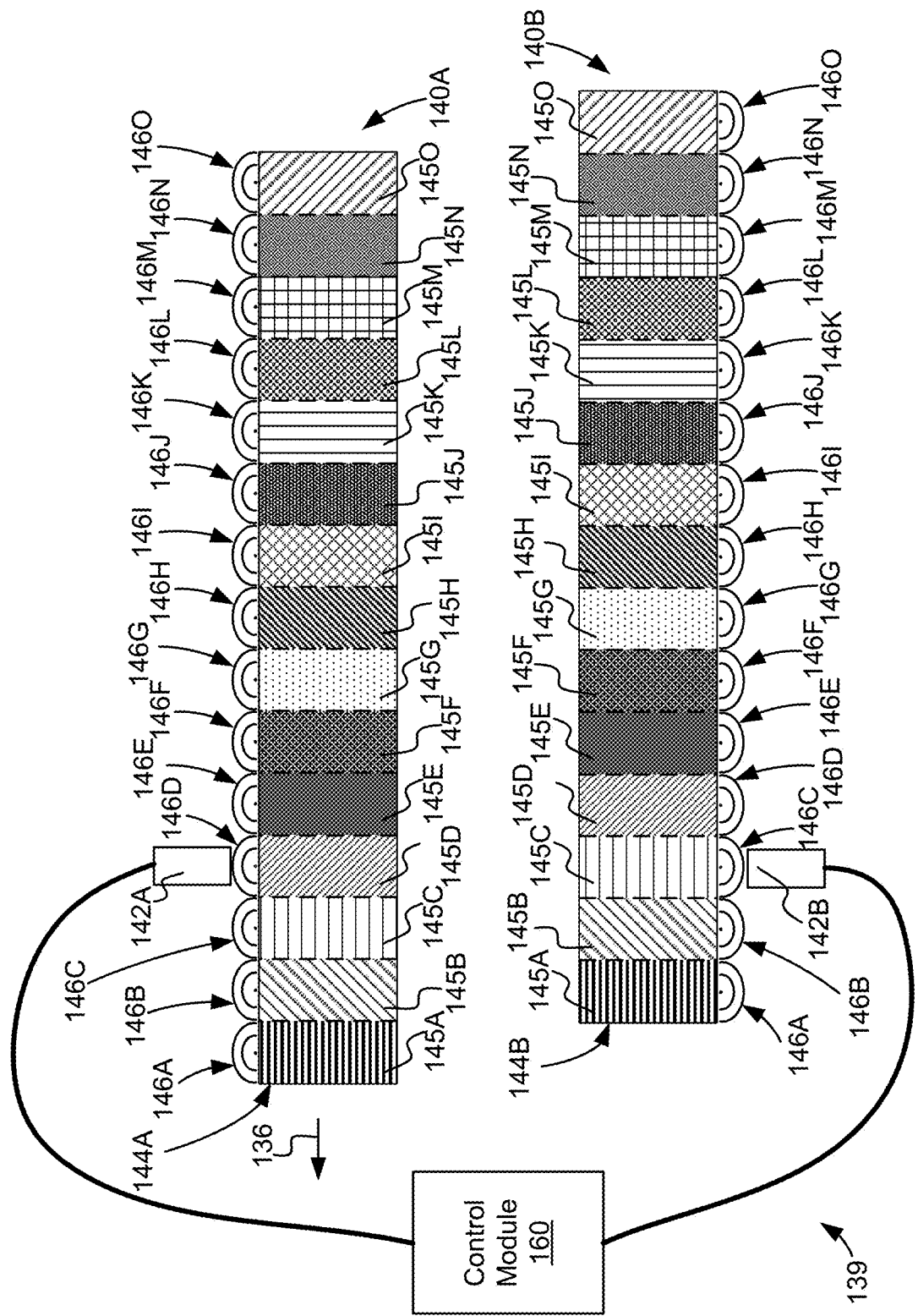
FIG. 9 is a is a schematic plan view of the first position sensor and the second position sensor of FIG. 8, but indicating a skew of the part, according to one or more examples of the present disclosure, according to one or more examples of the present disclosure.
Figure 10:
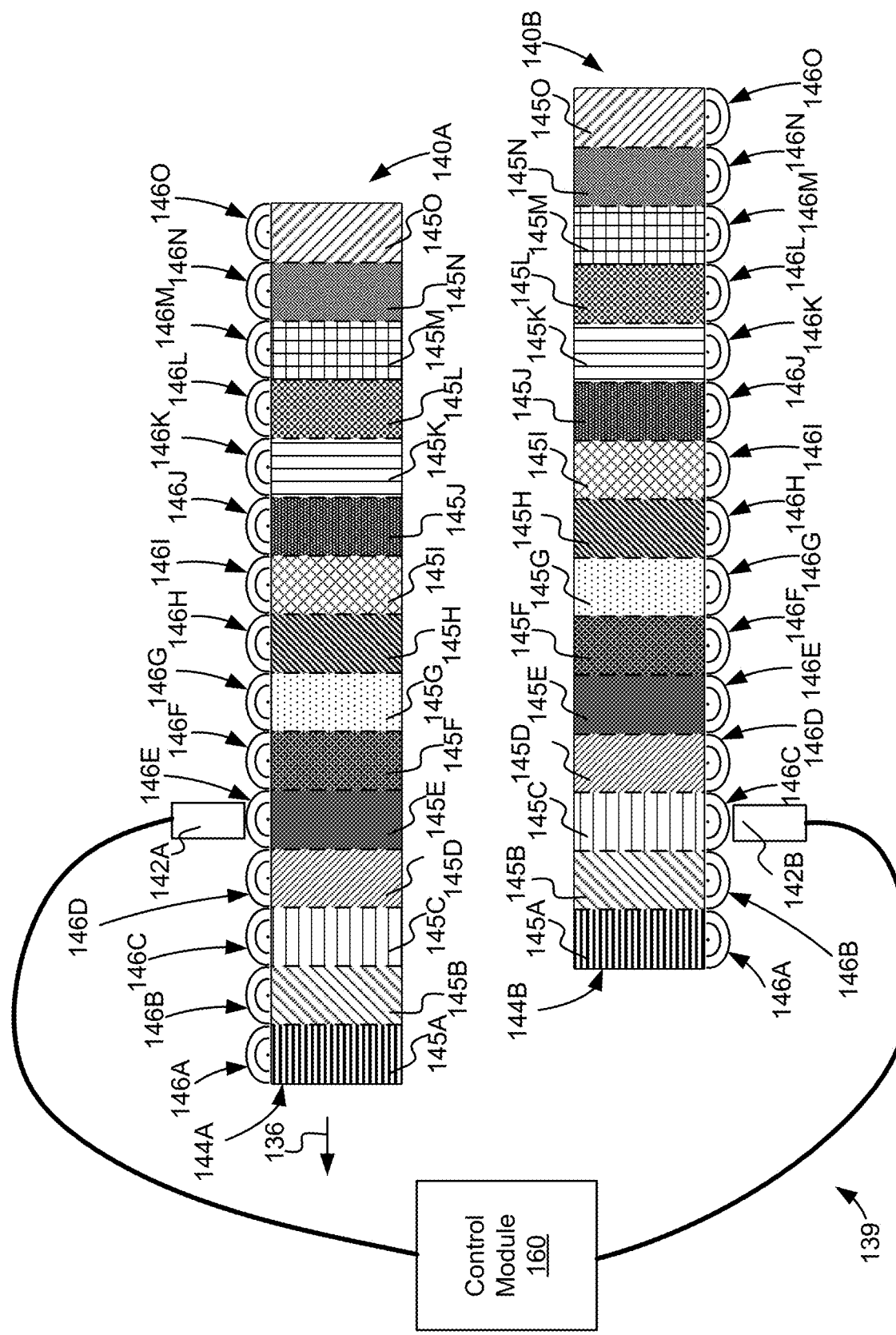
FIG. 10 is a is a schematic plan view of the first position sensor and the second position sensor of FIG. 9, but indicating a larger skew of the part, according to one or more examples of the present disclosure.

For example, referring to FIGS. 8-10, the first position sensor 140A and the second position sensor 140B are shown in different positions relative to each other to indicate varying levels of skew of the slat 130 relative to the wing 114. According to one embodiment, under normal operating conditions, the slat 130 is controlled to move without skew in a uniformly linear manner in either the extension direction 134 or the retraction direction 136. In other words, according to such an embodiment, the end portions 135, 137 are co-movable (i.e., do not move relative to each other) move together at the same time, at the same rate, in the same direction (e.g., either the extension direction 134 or the retraction direction 136), and the same distance. Accordingly, the slat 130 is unskewed when the first and second part positions 156A, 156B are the same. Any skew of the slat 130 caused by one of the end portions 135, 137 moving linearly in a non-uniform manner relative to the other of the end portions 135, 137 is undesired. Therefore, the aspect module 162 determines a skew of the slat 130 when the first and second part positions 156A, 156B, corresponding to the positions of the end portions 135, 137, respectively, are different or non-uniform.

Referring to FIG. 8, which illustrates the positions of the magnetic position indicator and the magnetic field sensor for both of the first position sensor 140A and the second position sensor 140B when the slat 130 is not skewed, the first magnetic field sensor 142A senses the magnetic field corresponding with the magnetic field source in the same position as the magnetic field source generating the magnetic field being sensed by the second magnetic field sensor 142B. More specifically, as shown, the first magnetic field sensor 142A senses the magnetic field 146C associated with the magnetic field source 145C of the first magnetic position indicator 144A, which is tied to a particular position (e.g., Position 2 from positional data 159) of the end portion 135 of the slat 130, and the second magnetic field sensor 142B senses the magnetic field 146C associated with the magnetic field source 145C of the second magnetic position indicator 144B, which is tied to the same particular position (e.g., Position 2) of the end portion 137 of the slat 130. Because the opposing end portions 135, 137 are in the same positions (e.g., Position 2), the slat 130 is not skewed. In such a situation, the aspect module 162 generates an aspect indicator 164 that indicates no skew of the slat 130.

Referring to FIG. 9, which illustrates the positions of the magnetic position indicator and the magnetic field sensor for both of the first position sensor 140A and the second position sensor 140B when the slat 130 is slightly skewed, the first magnetic field sensor 142A senses the magnetic field corresponding with the magnetic field source in a different position as the magnetic field source generating the magnetic field being sensed by the second magnetic field sensor 142B. More specifically, as shown, the first magnetic field sensor 142A senses the magnetic field 146D associated with the magnetic field source 145D of the first magnetic position indicator 144A, which is tied to a particular position (e.g., Position 3 from positional data 159) of the end portion 135 of the slat 130, and the second magnetic field sensor 142B senses the magnetic field 146C associated with the magnetic field source 145C of the second magnetic position indicator 144B, which is tied to a different position (e.g., Position 2) of the end portion 137 of the slat 130. In other words, the end portion 135 has moved, but the end portion 137 has not. Because the opposing end portions 135, 137 are in different positions (e.g., Positions 3 and 2, respectively), the slat 130 is skewed. But, in view of the slight difference in distance between Positions 2 and 3 (i.e., only one position apart), the skew of the slat 130 is only slight or minor. In such a situation, the aspect module 162 generates an aspect indicator 164 that indicates a slight or minor skew of the slat 130.

Referring to FIG. 10, which illustrates the positions of the magnetic position indicator and the magnetic field sensor for both of the first position sensor 140A and the second position sensor 140B when the slat 130 is significantly skewed, the first magnetic field sensor 142A senses the magnetic field corresponding with the magnetic field source in a different position as the magnetic field source generating the magnetic field being sensed by the second magnetic field sensor 142B. More specifically, as shown, the first magnetic field sensor 142A senses the magnetic field 146E associated with the magnetic field source 145E of the first magnetic position indicator 144A, which is tied to a particular position (e.g., Position 4 from positional data 159) of the end portion 135 of the slat 130, and the second magnetic field sensor 142B senses the magnetic field 146C associated with the magnetic field source 145C of the second magnetic position indicator 144B, which is tied to a different position (e.g., Position 2) of the end portion 137 of the slat 130. Because the opposing end portions 135, 137 are in different positions (e.g., Positions 4 and 2, respectively), the slat 130 is skewed. In view of the more significant difference in distance between Positions 2 and 4 (i.e., two positions apart), the skew of the slat 130 is significant or major. In such a situation, the aspect module 162 generates an aspect indicator 164 that indicates a significant or major skew of the slat 130, which can be quantified. Of course, more significant skewing of the slat 130 can occur and be detected and quantified by the system 139.

According to some configurations, relative movement of opposing or different locations on a part is desired, such as for a part that desirably rotates or twists when actuated. In such configurations, it may be desirable to know the relative positions of the opposing or different locations to ensure the part is rotating or twisting at a desired angular motion (e.g., speed) or orientation. In such configurations, the aspect module 162 is configured to monitor the differences between the first part position 156A and the second part position 156B and associate the differences with an orientation or angular motion of the part. For example, by monitoring changes in the relative positions of opposing locations on a part, the aspect module 162 determines the orientation (e.g., angle) of the part relative to another part. In such an example, the aspect indicator 164 indicates an orientation of the part. In an alternative example, the aspect module 162 not only monitors changes in the relative positions of opposing locations on a part, but also monitors the timing of changes in the relative positions of the opposing locations. By knowing how long it takes opposing locations on a part to change relative to each other, an angular motion (e.g., rate of change or angular speed) of the part can be determined. In such an alternative example, the aspect indicator 164 indicates an angular motion of the part.

Figure 11:
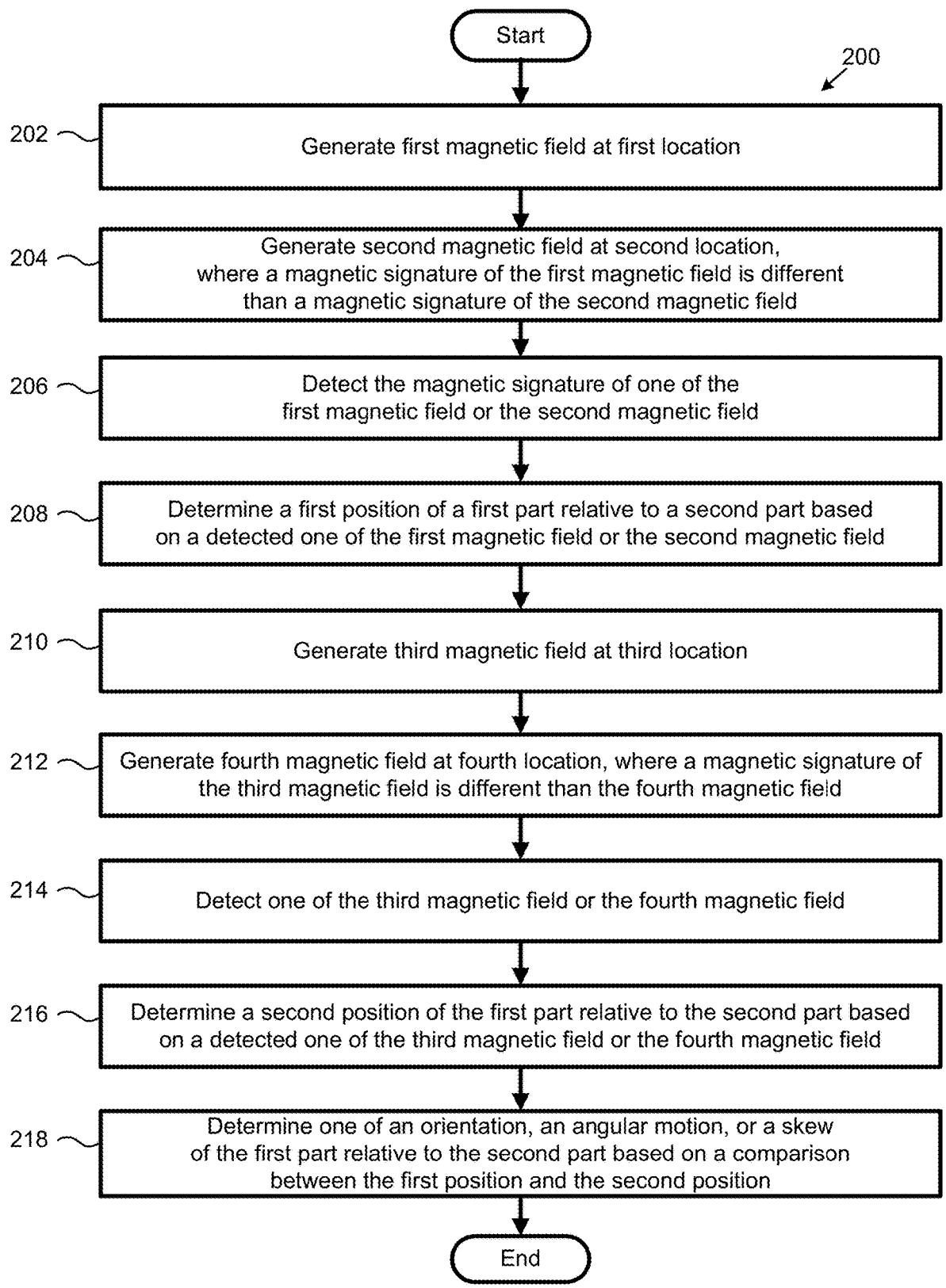
FIG. 11 is a schematic flow diagram of a method of determining a positional relationship between a first part and a second part, according to one or more examples of the present disclosure.

Now referring to FIG. 11, one embodiment of a method 200 of determining a positional relationship between a first part and a second part is shown. The first part is movable relative to the second part. The method 200 includes generating a first magnetic field at a first location of the part at 202 and generating a second magnetic field at a second location of the part at 204. The first location can be immediately adjacent the second location such that no gaps are present between the first and second magnetic fields. A magnetic signature of the first magnetic field is different than a magnetic signature of the second magnetic field. At 206, the method 200 includes detecting the magnetic signature of one of the first magnetic field or the second magnetic field. The method 200 additionally includes determining a first position of the first part relative to the second part based on a detected magnetic signature of one of the first magnetic field or the second magnetic field at 208. In some implementations, the method 200 ends at step 208.

However, in other implementations, the method 200 continues to generate a third magnetic field at a third location of the part at 210 and generate a fourth magnetic field at a fourth location of the part at 212. The third location and fourth location are spaced away from the first location and the second location. Furthermore, a magnetic signature of the third magnetic field is different than a magnetic signature of the fourth magnetic field. The method 200 also includes detecting the magnetic signature of one of the third magnetic field or the fourth magnetic field at 214. The method 200 further includes determining a second position of the first part relative to the second part based on a detected magnetic signature of one of the third magnetic field or the fourth magnetic field at 216. In some implementations, the method 200 additionally includes determining one of an orientation, an angular motion, or a skew of the first part relative to the second part based on a comparison between the first position and the second position at 218.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for determining a position of a first part relative to a second part, wherein the first part is movable relative to the second part and the apparatus comprises:
   a magnetic position indicator, non-movably fixed to the first part and comprising a plurality of magnetic field sources, wherein:
      each magnetic field source of the plurality of magnetic field sources generates a magnetic field having a unique magnetic signature,
      the magnetic position indicator comprises a single continuous material,
      the single continuous material comprises the plurality of magnetic field sources formed within the single continuous material, and
      the plurality of magnetic field sources comprises one or more pairs of immediately adjacent magnetic field sources in contact with each other and positioned consecutively along a length of the magnetic position indicator; and
   a magnetic field sensor, non-movably fixed to the second part and configured to detect the unique magnetic signatures of the magnetic fields generated by the plurality of magnetic field sources of the magnetic position indicator.

2. The apparatus according to claim 1, wherein the plurality of magnetic field sources are formed consecutively along the length of the magnetic position indicator.

3. The apparatus according to claim 1, wherein each magnetic field source of the plurality of magnetic field sources has permanent magnetic properties that are different than any other magnetic field source of the plurality of magnetic field sources.

4. The apparatus according to claim 1, wherein each magnetic field source of the plurality of magnetic field sources has a unique pole pattern comprising a north pole region and a south pole region.

5. The apparatus according to claim 4, wherein orientations of the north pole regions and the south pole regions of the magnetic field sources reversibly alternate along the magnetic position indicator.

6. The apparatus according to claim 1, wherein each unique magnetic signature comprises at least one of:
   a magnetic field magnitude that is different than a magnetic field magnitude of any other unique magnetic signature;
   a magnetic field shape that is different than a magnetic field shape of any other unique magnetic signature;
   a magnetic field depth that is different than a magnetic field depth of any other unique magnetic signature; or
   a location of a center of the magnetic field that is different than a location of the center of the magnetic field of any other unique magnetic signature.

7. The apparatus according to claim 1, wherein the magnetic field sensor is configured to isolate the unique magnetic signature of a magnetic field in closest proximity to the sensor from the unique magnetic signatures of all other magnetic fields.

8. The apparatus according to claim 1, wherein the single continuous material has a magnetic pattern, sequentially changing along the length of the magnetic position indicator, formed in the single continuous material and defining the plurality of magnetic field sources.

9. The apparatus according to claim 1, wherein:
   the magnetic field sensor has a size equal to or smaller than each of the magnetic field sources; and
   the first part is movable relative to the second part such that the magnetic field sensor is movable along the length of the magnetic position indicator.

10. A system for determining a positional relationship between a first part and a second part, wherein the first part is movable relative to the second part and the system comprises:
    a first magnetic position indicator, non-movably fixed to one of the first part at a first location of the first part or the second part at a second location of the second part, and comprising a plurality of first magnetic field sources, wherein:
       each first magnetic field source of the plurality of first magnetic field sources generates a first magnetic field having a first unique magnetic signature,
       the first magnetic position indicator comprises a single continuous material,
       the single continuous material comprising the plurality of first magnetic field sources formed within the single continuous material, and
       the plurality of first magnetic field sources comprises one or more pairs of immediately adjacent magnetic field sources in contact with each other and positioned consecutively along a length of the magnetic position indicator;
    a first magnetic field sensor, non-movably fixed to the other one of the first part at the first location of the first part or the second part at the second location of the second part, and configured to detect the first unique magnetic signatures of the first magnetic fields generated by the plurality of first magnetic field sources of the first magnetic position indicator, wherein the first magnetic field sensor is the only magnetic field sensor positioned to detect the first magnetic fields of the first magnetic position indicator; and
    a position module, configured to receive a detected first unique magnetic signature from the first magnetic field sensor and to determine a first position of the first part relative to the second part based on the detected first unique magnetic signature.

11. The system according to claim 10, wherein the position module is further configured to determine the first position of the first part relative to the second part based on the detected first unique magnetic signature without reliance on previously detected first unique magnetic signatures and without reliance on a known direction of movement of the first part relative to the second part.

12. The system according to claim 10, wherein the position module stores positional data that correlates a respective one of a plurality of different positions of the first part relative to the second part to each of the first unique magnetic signatures of the first magnetic fields.

13. The system according to claim 10, further comprising:
a second magnetic position indicator, non-movably fixed to one of the first part at a third location of the first part or the second part at a fourth location of the second part, and comprising a plurality of second magnetic field sources positioned along a length of the second magnetic position indicator, wherein each second magnetic field source of the plurality of second magnetic field sources generates a second magnetic field having a second unique magnetic signature; and
a second magnetic field sensor, non-movably fixed to the other one of the first part at the third location of the first part or the second part at the fourth location of the second part, and configured to detect the second unique magnetic signatures of the second magnetic fields generated by the plurality of second magnetic field sources of the second magnetic position indicator;
wherein the position module is further configured to receive a detected second unique magnetic signature from the second magnetic field sensor and to determine a second position of the first part relative to the second part based on the detected second unique magnetic signature.

14. The system according to claim 13, further comprising an aspect module, configured to determine at least one of an orientation, angular motion, or skew of the first part relative to the second part based on a comparison between the first position and the second position determined by the position module.

15. The system according to claim 14, wherein the aspect module is further configured to determine the at least one of the orientation, angular motion, or skew of the first part relative to the second part based on a difference between the first position and the second position determined by the position module.

16. The system of claim 10, further comprising an aircraft, comprising the first part and the second part.

17. The system according to claim 10, wherein the plurality of first magnetic field sources are formed consecutively along the length of the first magnetic position indicator.

18. The system according to claim 10, wherein each first magnetic field source of the plurality of first magnetic field sources has permanent magnetic properties that are different than any other first magnetic field source of the plurality of first magnetic field sources.

19. The system according to claim 10, wherein the first magnetic field sensor is configured to isolate the unique magnetic signature of a magnetic field in closest proximity to the sensor from the unique magnetic signatures of all other magnetic fields.

20. The system according to claim 10, wherein the single continuous material has a magnetic pattern, sequentially changing along the length of the first magnetic position indicator, formed in the single continuous material and defining the plurality of first magnetic field sources.

* * * * *